United States Patent [19]

Togami et al.

[11] 4,173,155

[45] Nov. 6, 1979

[54] VARIABLE DIAMETER TORQUE SENSING DRIVE

[75] Inventors: Paul G. Togami, East Moline; T. Gary Drayer, Silvis, both of Ill.; James M. Francis, Bettendorf, Iowa

[73] Assignee: International Harvester Company, Chicago, Ill.

[21] Appl. No.: 833,776

[22] Filed: Sep. 16, 1977

[51] Int. Cl.² .................... F16H 55/52; F16H 55/56
[52] U.S. Cl. .................. 74/230.17 M; 74/230.17 L; 29/256
[58] Field of Search ............ 74/230.17 M, 230.17 L, 74/230.17 A, 230.17 R, 230.17 B; 29/256, 225, 226, 227

[56] References Cited

U.S. PATENT DOCUMENTS

| | | | |
|---|---|---|---|
| 1,494,832 | 5/1924 | Grant | 29/227 |
| 2,068,784 | 1/1937 | Abbott | 74/230.17 M |
| 2,202,553 | 5/1940 | Heyer | 74/230.17 L |
| 2,254,177 | 8/1941 | Getchell | 74/230.17 M |
| 2,283,392 | 5/1942 | Shadrick | 74/230.17 L |
| 2,746,816 | 5/1956 | Michie et al. | 74/230.17 L |
| 2,797,587 | 7/1957 | Michie | 74/230.17 L |
| 2,908,177 | 10/1959 | Powell | 74/230.17 L |
| 2,951,388 | 9/1960 | Tacquet | 74/230.17 |
| 2,952,161 | 9/1960 | Williams | 74/230.17 L |
| 3,078,556 | 2/1963 | Carroll | 29/226 |
| 3,190,135 | 6/1965 | Berens | 74/230.17 M |
| 3,224,287 | 12/1965 | Gesche et al. | 74/230.17 M |
| 3,481,342 | 12/1969 | Rowland-Hill et al. | 56/14.6 |
| 3,552,223 | 1/1971 | Glasson et al. | 74/230.17 L |
| 3,571,884 | 3/1971 | Chung | 29/227 |
| 3,605,510 | 9/1971 | Laughlin | 74/230.17 |
| 3,628,389 | 12/1971 | Wiegelmann | 74/230.17 M |
| 3,709,051 | 1/1973 | Boissin | 74/230.17 M |
| 3,722,308 | 3/1973 | Steuer | 74/230.17 M |
| 3,739,651 | 6/1973 | Lewis | 74/230.17 M |
| 3,842,637 | 10/1974 | Wilson | 74/230.17 M |
| 3,881,370 | 5/1975 | Vogelaar et al. | 74/230.17 F |
| 3,949,459 | 4/1976 | Marenchin | 29/256 |
| 3,996,811 | 12/1976 | Reese | 74/230.17 E |
| 4,026,161 | 5/1977 | Vogel | 74/120.17 M |
| 4,033,195 | 7/1977 | Takagi et al. | 74/230.17 L |

FOREIGN PATENT DOCUMENTS

| | | | |
|---|---|---|---|
| 1550920 | 8/1969 | Fed. Rep. of Germany | 74/230.17 M |
| 921462 | 5/1947 | France | 74/230.17 L |
| 764844 | 1/1957 | United Kingdom | 74/230.17 L |

Primary Examiner—Samuel Scott
Assistant Examiner—William R. Henderson
Attorney, Agent, or Firm—F. David AuBuchon

[57] ABSTRACT

A load responsive torque sensing unit adapted to drive the rotor of an axial flow combine and including a variable pitch V-belt input sheave, and an output shaft concentric therewith, the latter having means for connecting it drivingly to the combine rotor. The input sheave consists of a pair of sheave sections, one of which is axially fixed on the output shaft in direct driving relationship, and the other of which is axially slidable, but freely rotatable, relative to the output shaft toward and away from the fixed section for V-belt reception therebetween. A compression spring yieldingly biases the shiftable section toward the fixed section, while a cam on the shiftable section cooperates with a pair of cam followers which rotate in unison with the fixed section and shaft in such a manner that an increase in the load on the output shaft will cause the cam to ride on the followers and force the slidable section toward the fixed section, thus increasing the side forces acting on the V-belt to prevent belt slippage, thereby tensioning the belt only insofar as is required to transmit the necessary torque for output shaft driving purposes. The unit is designed for cooperation with a special draw bolt arrangement which facilitates dismantling of the unit.

12 Claims, 8 Drawing Figures

VARIABLE DIAMETER TORQUE SENSING DRIVE

The improved torque sensing unit comprising the present invention has been designed primarily for use as a transmission assembly in connection with the driving of the threshing rotor of a harvesting combine, especially a combine of the axial flow type. The invention is however capable of other uses and torque sensing units embodying the principles of the invention may, if desired, with or without modification as required, be employed as a transmission mechanism for powering a wide variety of heavy duty equipment where sudden changes in the applied load are encountered. Irrespective however of the particular use to which the invention may be put, the essential features thereof remain substantially the same.

Heretofore, in connection with harvesting combine rotors, a sudden increase in the load imposed upon the rotor, occasioned for example by the deposition of an unusually large mat or quantity of the material undergoing threshing into the combine concave, has resulted in slipping of the V-belts in the transmission mechanisms which are employed to connect the combine engine to the rotor, thus resulting in short belt life.

The present invention is designed to overcome the above noted difficulty that is attendant upon conventional drive transmissions for combine rotors and, toward this end, the invention contemplates the incorporation with a V-belt transmission of a torque sensing unit having a variable pitch input sheave and an output shaft provided with facilities whereby it may be drivingly connected to the rotor shaft of a harvesting combine. The input sheave includes a pair of sheave sections, one of which is splined directly to the output shaft and is axially fixed, while the other section is freely rotatably on and axially shiftable within limits with respect to such output shafts so that it may move toward and away from the fixed section for V-belt reception therebetween. A compression spring yieldingly biases the shiftable section toward the fixed section, while cooperating cam means are effective between the axially shiftable section and the output shaft to augment the action of the compression spring and force the shiftable section toward the fixed section when an increase in the load on the output shaft is encountered, thereby increasing the side forces acting on the V-belt to prevent belt slippage.

Torque sensing devices of this general character are known, but they have not been found precisely suitable for use in connection with the driving of the rotor of a harvesting combine. One such device is shown and described in U.S. Pat. No. 3,842,637, granted on Oct. 22, 1974 and entitled "Combine Drive Torque Sensing." Other and similar torque sensing devices are currently in use for driving a wide variety of equipment but, where they are put to agricultural use in connection with a harvesting combine invariably they are employed to drive the traction wheels of the combine. None of them is associated with the powering of a combine rotor.

The present invention is designed as an improvement over such known torque sensing devices and it embodies a torque sensing unit which is especially well adapted for combine rotor drive purposes, involving as it does the use of novel cam elements which are effective between the shiftable sheave section and the output shaft, such elements affording a more effective torque response than has hitherto been attained despite the fact that the principal cam element employed may be in the form of a casting which requires no machining whatsoever for its efficiency. Moreover, the cam elements employed are smooth and silent in their operation and are considerably less subject to wear than are the cam elements associated with known torque sensing devices of the same general type. Still further, improved lubricant retaining and sealing as well as lubricant purging facilities are incorporated in the present torque sensing unit, the former operating to prevent inadvertent application of lubricant to the V-belt associated with the unit, while the purged lubricant is applied to the mating cam surfaces involved. Still further, the present torque sensing unit is readily susceptible to dismantling and reassembling procedures, separate and novel draw bolt means being provided to facilitate such dismantling and reassembly.

The provision of a torque sensing unit such as has briefly been outlined above, and possessing the stated advantages, constitutes the principal object of the present invention. Numerous other objects and advantages of the invention, not at this time enumerated, will readily suggest themselves as the nature of the invention is better understood.

In the accompanying three sheets of drawings forming a part of this specification, one illustrative embodiment of the invention has been shown.

In these drawings.

Referring now to the drawings in detail, the torque sensing unit 10 of the present invention is shown in considerable detail in FIGS. 2 through 6 and it is capable of many applications. The unit 10 is of the type which is used with a V-belt drive mechanism and it includes a variable diameter or pitch input V-belt sheave 12 and an output shaft 14. The input sheave 12 may receive power from a suitable power source such as an internal combustion engine and the output shaft 14 may be put to any desired use in the performance of useful work, as for example driving the traction wheels of a vehicle or driving the input shaft of a wide variety of machinery. The sensing unit is torque-responsive in that as the load or resistance which is applied to the output shaft 14 increases so that there is slippage between the V-belt 84 and sheave section 80, the input V-belt sheave will tend to increase its effective diameter in such a manner as to overcome the increase in load and present slippage. In this manner, belt tension is adjusted automatically to a correct level so that when sudden peak loads are encountered, there will be no belt slippage and belt life will be preserved.

Figure 1:
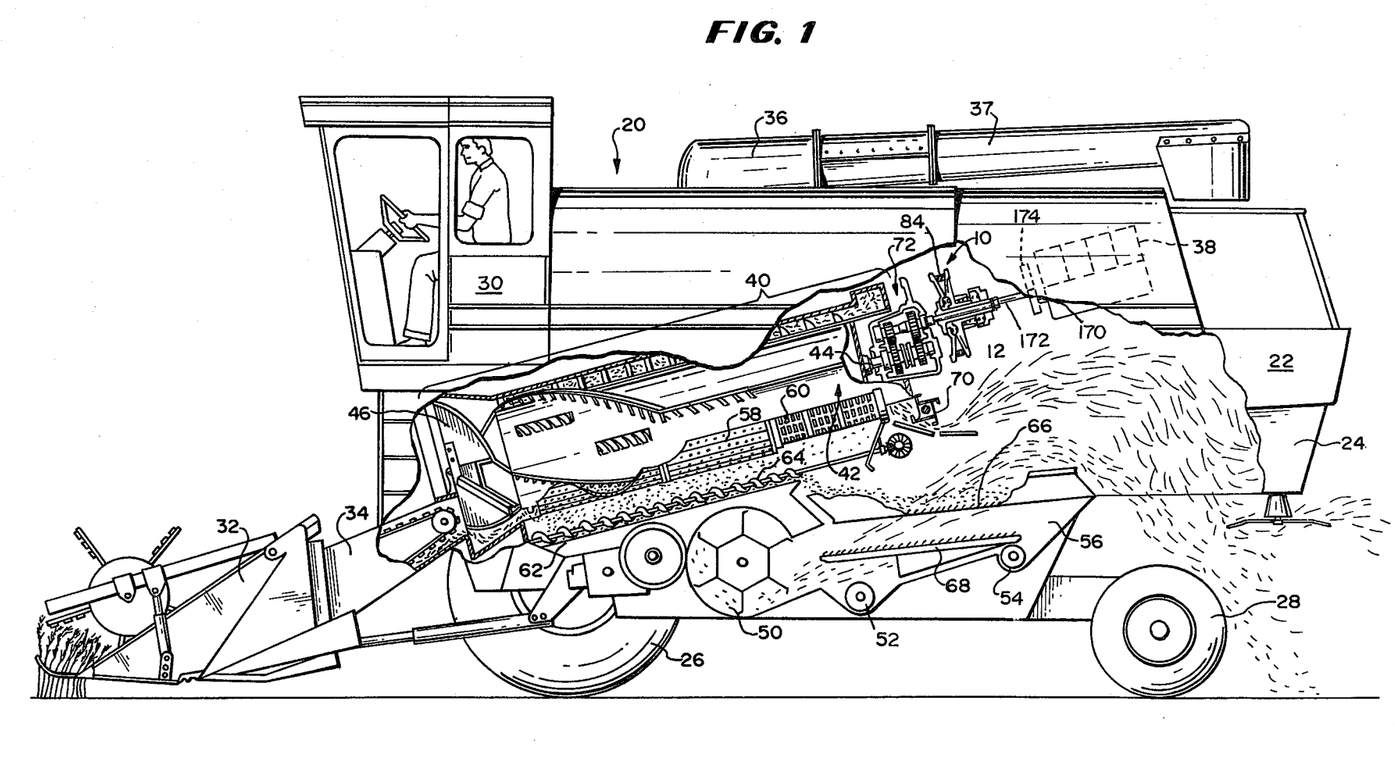
FIG. 1 is a side elevational view, partly in section, of an axial flow-type combine with a major portion of one side wall being broken away to reveal the crop-gathering means, the crop-feeding means, the crop-impelling means, the axial threshing and separating means, the grain cleaning and handling means, and the residue discharge means, the view illustrating specifically the preferred positional relationship which the torque sensing unit of the present invention assumes relative to the combine engine and the rotor of the axial threshing and separating means.

The torque sensing unit 10 has been particularly designed for use in connection with the driving of the rotor of an axial flow-type harvesting combine of the general type shown and described in U.S. Pat. No. 3,481,342, granted on Dec. 2, 1969 and entitled "Axial Flow-Type Combine." Accordingly, such a combine is shown in FIG. 1 and designated in its entirety by the reference numeral 20. The combine 20 involves in its general organization a chassis or body 22 having vertical side wall 24, the body portion being supported by a pair of relatively large driven wheels 26 in the front region of the combine, and a pair of steerable or dirigible wheels 28 at the rear thereof. The combine 20 further includes an operator's platform and cab 30, a crop-gathering header 32, a feeder 34, a grain elevator 36 from which there extends a grain delivery chute 37, and an engine 38. A grain tank (not shown) is enclosed within the walls of the body portion 12.

As is the case in connection with axial flow-type combines of the character under consideration, the axial threshing and separating means are embodied in an elongated and generally cylindrical member 40 in the form of a rotor casing having a rotor 42 mounted therein, the rotor being provided with a central rotor shaft 44. The forward end of the rotor shaft carries a vaned impeller 46 of the helix type. Other conventional components not specifically related to the present invention, and which are more or less schemmatically illustrated herein, are the blower 50, grain auger 52 leading to the aforementioned grain elevator 36, and a tailings auger 54, these components being enclosed within a lower casing section 56 beneath the chassis or body portion 22. The lower portion of the rotor casing 40 is made up of the usual concave 58 and a grate 60. A conveyor structure 62 having augers 64 associated therewith is disposed beneath the rotor casing 40 and receives separated grain from the concave and grate sections 58 and 60 and discharges the grain onto a chaffer sieve 66. Such sieve is reciprocated in a fore and aft direction so as to pass the grain and tailings to a grain sieve 68 which also is reciprocated in order to separate the tailings so that the grain passes through such sieve and into the grain auger 52 while the tailings are returned to the rotor casing 40 by elevator means (not shown). A terminal beater 70 at the rear end of the rotor casing 40 prepares the straw residue for discharge from the combine rearwardly thereof.

The arrangement of parts thus far described is purely conventional and no claim is made herein to any novelty associated with the same, the novelty of the present invention residing rather in the nature of the power train which extends from the engine 38 to the rotor shaft 44 and which includes the aforementioned torque sensing unit 10 which, under certain circumstances might be employed in association with its V-belt drive mechanism as a direct drive for the rotor shaft 44 of the combine 20 but which preferably has associated therewith a dual-speed gear case arrangement which has been designated in its entirety at 72 in FIG. 1. Such dual-speed gear case arrangement 72 is especially designed for use in conjunction with the torque sensing unit 10 in the manner illustrated both in FIG. 1 and FIG. 7 for driving the rotor shaft 44 but, per se, it constitutes no part of the present invention. Rather it constitutes the subject matter of a copending United States application, Ser. No. 833,775, filed on Sept. 16, 1977, and entitled "Dual-Speed Gear Case Assembly for a Harvesting Combine Rotor Drive."

Figures 2, 2A, 3:
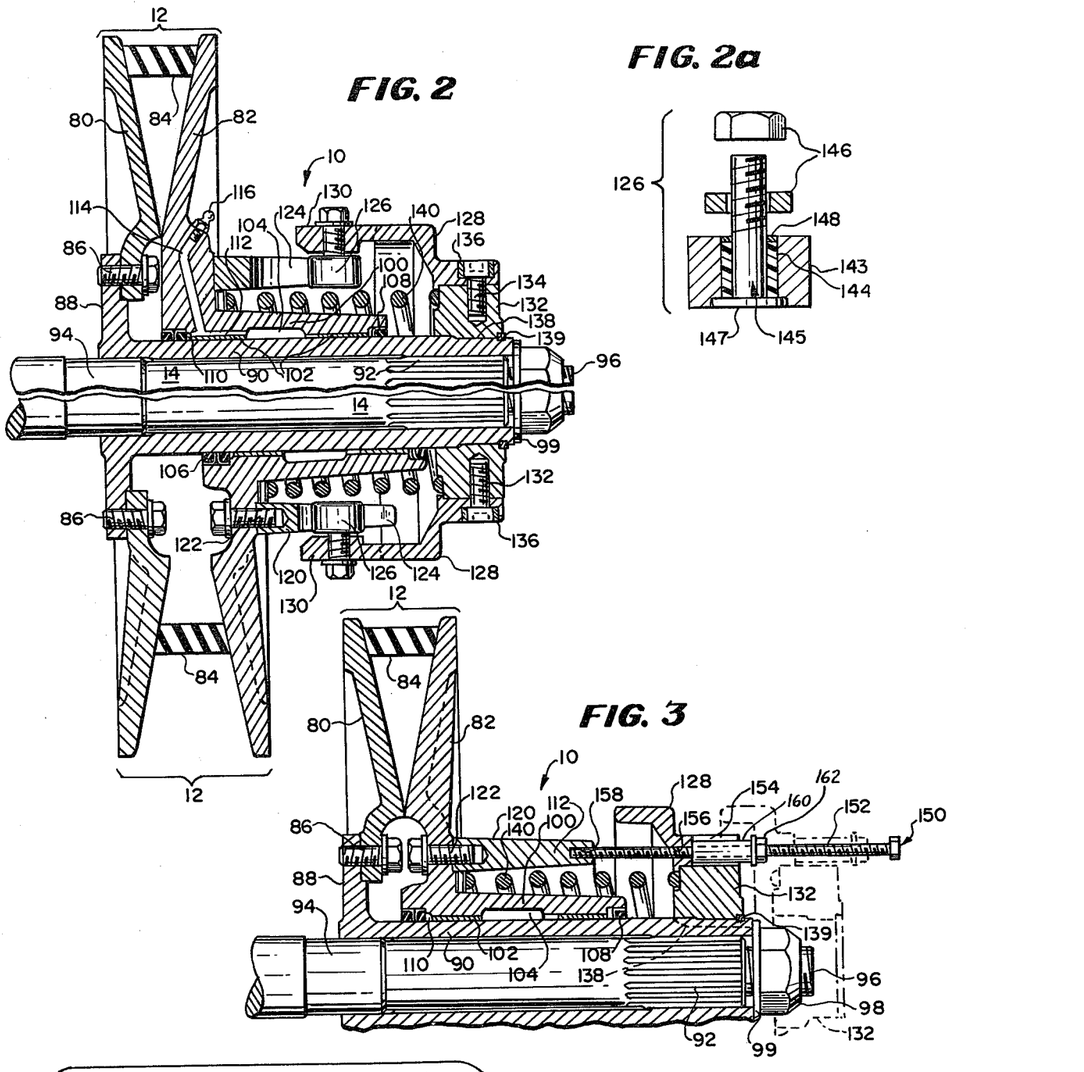
FIG. 2 is an enlarged sectional view taken substantially centrally, longitudinally and vertically through the torque sensing unit, the view being made in complementary sections, one of which shows the input sheave of the unit in fully closed condition and the other of which shows the sheave in a partially open condition.
FIG. 2a is an enlarged exploded sectional view of a portion of the structure shown in FIG. 2, the view being taken through one of the cam followers employed in connection with the invention.
FIG. 3 is a fragmentary sectional view, similar to FIG. 2 illustrating the manner in which the relatively large spring force embodied in the torque sensing unit may be relieved preparatory to disassembling the unit.

Considering now the torque sensing unit 10 per se and referring particularly to FIG. 2 the aforementioned variable diameter input sheave 12 is shown in section with the upper half of the view showing the sheave in its closed position for a large diameter drive, and the lower half of the view showing such sheave in a partially open position for a small diameter drive. The sheave 12 is comprised of two sheave halves having V-belt engaging sheave sections including an axially fixed front section 80 and an axially shiftable rear section 82, the V-belt being designated by the reference numeral 84. The terms "front" and "rear" as used herein throughout the remainder of the specification, as well as in the appended claims, refer to the positional relationship which the installed torque sensing unit 10 bears with respect to the combine 20. The sheave section 80 is secured by bolts 86 to a radial flange 88 on the forward end of an inner cylindrical sleeve 90 which encompasses the aforementioned output shaft 14, is drivingly mounted on such shaft by means of a splined connection 92 at the rear end of the sleeve, and has a pilot connection which is established by an enlargement 94. The extreme rear end of the shaft 14 is provided with a reduced diameter threaded section 96 which receives thereover a nut 98 while a washer 99 is interposed between the nut 98 and sleeve 90. The washer 99 and spline connection 92 cooperate with each other to prevent axial movement of the inner sleeve 90 on the shaft 14.

The axially shiftable sheave section or half 82 is formed with a rearwardly extending generally cylindrical portion or outer sleeve 100 which is axially shiftable on the inner sleeve 90 by means of bushings 102 on opposite sides of a central annular groove 104. The front end of the sleeve portion 100 is recessed to accommodate a pair of tandem arranged lubricant retaining lip seals 106 which oppose each other. The rear end of the sleeve portion 100 is similarly recessed to accommodate a single lubricant purging seal 108. The annular groove 104 establishes a central grease cavity between the two bushings 102. A relatively small grease cavity 110 exists between the forward lip seals 106 and the adjacent bushing 102 and this latter bushing is provided with a longiudinally extending passage 112 which establishes communication between the small grease cavity 110 and the central grease cavity established by the groove 104. The passage 112 communicates with a generally radial grease inlet passage 114 which is provided with a zerk fitting 116. By such an arrangement of passages and cavities, greasing of the radial passage 114 will serve to conduct grease to both bushings 102, as well as to the dual or tandem arrange lip seals 106. The single lip seal 108 at the rear end of the sleeve portion 100 allows excess grease to be purged.

Still referring to FIG. 2 and additionally to FIG. 4 a generally tubular cylindrical torque sensing cam member 120, which will hereinafter be referred to simply as the cam, is secured by bolts 122 to a radial surface on the rear shiftable sheave section 82. The cam 120 is of cylindrical configuration and its front circular end region abuts against the sheave section so that the cam projects rearwardly in surrounding relationship with respect to the sleeve portion 100 of the sheave section 82. The cam 120 is preferably formed by a casting operation and, in the casting thereof, two diametrically opposed cam lobes are formed and define therebetween a pair of diametrically opposed rearwardly facing torque-transmitting cam races 124 (see particularly FIG. 4) which are open at their rearward or outer ends. The two cam races 124 are designed for cooperation with a pair of bushing-type torque-receiving cam followers 126 having bushings associated therewith. The followers 126 project radially inwardly into the cam races 124 and are supported in diametrically disposed relation on the inner sides of a cam follower-supportng sleeve or ring 128. Actually the cam followers 126 are not supported within the confines of the follower sleeve or ring 128 but rather they are carried on and secured to a pair of diametrically opposed forward projections or ears 130 which are formed on the open front circular end of the cam follower sleeve 128. The rear end of the cam follower sleeve 128 is received over and secured to a collar-like follower sleeve-supporting hub 132 by means of a pair of oppositely disposed pivot studs 134 which allow for limited side-to-side swinging or pivotal motion of the sleeve 128 in a manner and for purposes that will be made clear presently. The heads of the studs 134 are countersunk in ears 135 (FIGS. 5 and 7 that project rearwardly from the rear end region of the sleeve 128 and are surrounded by non-metallic bushings 136, the stud heads seating on a pair of flat surfaces 137 (FIG. 4) which are formed on the opposite sides of the otherwise cylindrical follower hub 132. The hub 132 is splined as indicated at 138 to the output shaft 14 and a snap ring 139 is used to hold the hub 132 in position on the sleeve 90.

A helical compression spring 140 surrounds the cylindrical sleeve portion 100 of the shiftable sheave section 82, the spring effectively bearing at its front end against a radial surface on the sheave section 82. A circular roller type thrust bearing 142 encompasses the sleeve portion 100 and is interposed between the forward end of the spring 140 and the sheave section 82. The spring 140 thus yieldingly biases the sheave section 82 toward the sheave section 80.

Considering the nature of the followers 126, and referring particularly to FIG. 2a, each such follower is in the form of a steel roller 143 which is mounted on an inner plastic or graphite bushing 144 which is telescopically received over the shank portion of a stud 145. The stud is threadedly received through the adjacent ear 130 of the ring 128 and is held in position thereon by a nut and washer arrangement 146. A stud head 147 and a press on washer-like retainer 148 serve to maintain the follower roller parts in position on the stud 145.

Figures 5, 6:
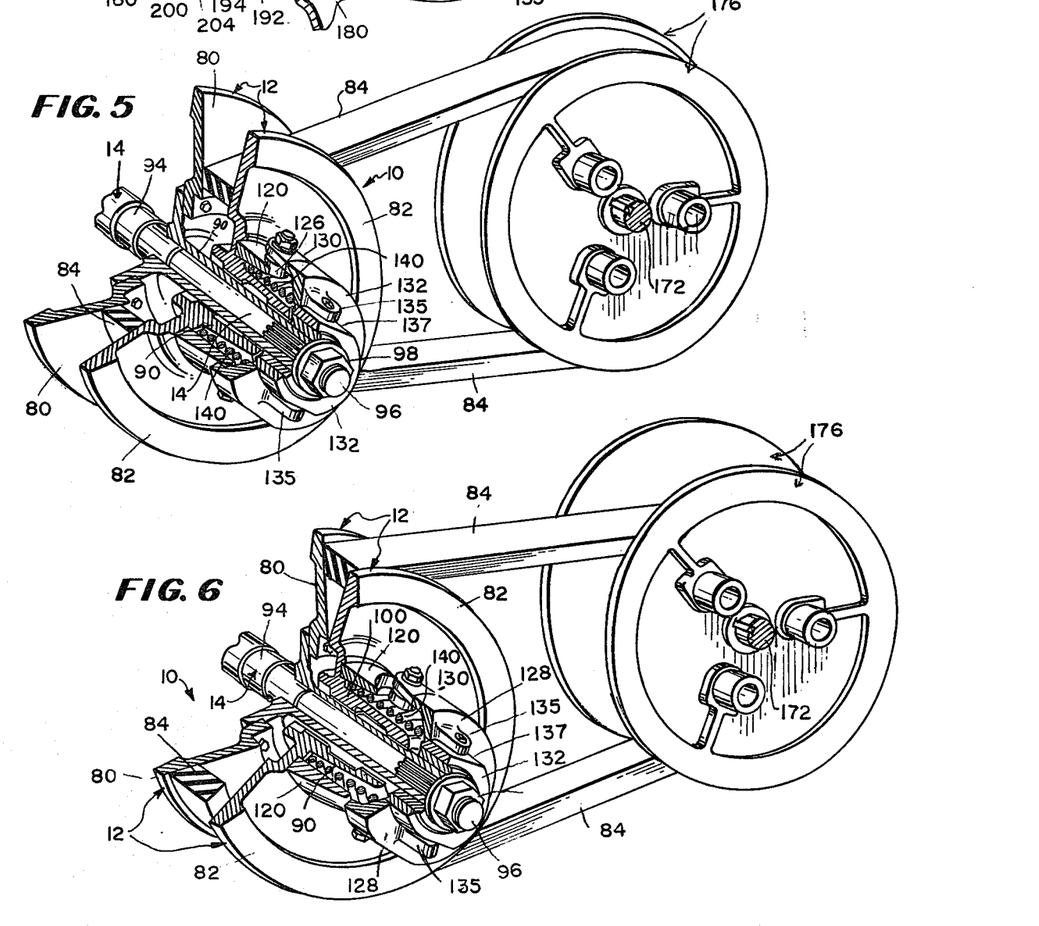
FIG. 5 is a fragmentary rear three-quarter sectional view of the torque sensing unit, showing the input sheave in its fully open condition and operatively connected to an engine-driven jackshaft by a conventional belt and pulley mechanism.
FIG. 6 is a sectional view, similar to FIG. 5 showing the input sheave of the torque sensing unit in its fully closed condition.

In the operation of the herein described torque sensing unit 10, assuming that the sheave sections 80 and 82 are in their substantially closed positions so that the belt is engaged by the outer rim regions of the sheave sections as shown in the upper half of FIG. 2, and assuming that the input sheave 12 is rotating in a counterclockwise direction as shown in both FIGS. 5 and 6 so that the upper rung of the belt is moving toward the viewer in FIG. 2, the power which is transmitted by the belt to the output shaft is equally divided through two friction-derived power trains which exist by reason of the fact that opposed axial forces are applied to the sides of the belt 84 by the two sections 80 and 82. One-half of the power which is transmitted by the frictional drag of the belt is conducted by the sheave section 80 directly to the shaft 14 by reason of the splined connection 92. The other half of the power transmitted by the frictional drag of the belt 84 is fed into the sheave section 82 which is free to rotate relative to the sheave section 80 except insofar as it is retrained by the mating engagement between the surfaces of the cam races 124 on the cam 120 which is attached to the sheave section 82 and the cam followers 126 which are carried on the sleeve 128, the latter being mounted on the hub 132 that is splined to the sleeve 90. Since the follower sleeve 90 is splined to the output shaft 14 and the follower hub is splined to the sleeve, the followers 126 are constrained to rotate in unison with the shaft 14.

From the above description it will be apparent that the magnitude of the compressive force (side force) on the belt 84 is the sum of the force exerted by the spring 140 on the sheave section 82 and the force exerted by the cam 120 at such time as the edges of the cam recesses 124 ride forwardly on the cam follower 126 incident to a change in the load or resistence which is encountered. If the resistance increases, thus increasing the compressive forces on the opposite sides of the belt 84, the torque transmitted by engagement of the cam followers 126 and the cam surfaces of the cam recesses 124 also increases.

It is to be noted at this point that because the cam follower sleeve 128 is permitted to swing from side to side, about the common axis of the studs 134, the load or force exerted on the surfaces of the cam recesses 124 by the cam followers 126 is equalized despite any condition of wear which may take place under prolonged use. It is also to be noted by reference to FIG. 4 that the spring 140 is left hand wound in order that as the spring is compressed incident to high torque application it will tend to increase its compressive force on the axially shiftable sheave section 82. It is also to be noted that the cam races 124 are designed so that there is practically no circumferential lost motion between the cam 120 and the cam followers 126, the only relative motion that takes place being an axial one with respect to the cam. This is achieved by developing the surfaces of the two cam races 124 so that the contact point or line between each surface and the cylindrical side of its respective follower roller is diametrically disposed across from the contact point or line between the other surface 124 and its respective follower. Moreover, these contact lines are coaxial, by such an arrangement, during operation of the torque sensing unit 10, the common centerline of the two cam followers 126 remains at all times in intersecting relationship with the longitudinal centerline or axis of the cam 120. Finally, it will be observed that the aforementioned lubricant purging seal 108 lies within the confines of the cam follower supporting ring 128 so that lubricant purged from this seal will be applied by centrifugal action to the follower rollers 126.

In the description thus far, the output shaft 14 has been considered as constituting an element of the torque sensing unit 10 inasmuch as, as previously stated, such output shaft may be put to various uses. However, according to the environmental aspects of the present invention, the output shaft 14 is used as the driving member for the previously mentioned two-speed gear case mechanism 72 (FIGS. 1 and 7) which embodies the output shaft 14 as its own input shaft and has associated therewith a separate output shaft 149 which transmits its rotary motion to the rotor drive shaft 44 for the combine rotor 42 by a spline connection (not shown). The nature of the two-speed gear case mechanism 72 will be briefly described herein presently but for a more complete understanding thereof reference may be had to the aforementioned application, Ser. No. 833,775. The torque sensing unit 10, when used in conjunction with the gear case mechanism 72 for rotor driving purposes, may be considered as not to include the output shaft 14 but, instead, to embody the sleeve 90 as its terminal output member, such sleeve being adapted for installation over the shaft 14 by a sliding motion, after which the nut and washer combination 98, 99 is used to hold the sleeve in position on the shaft and in driving relationship with respect thereto by reason of the spline connection 92. When consdered in this regard, the entire torque sensing unit may be removed bodily as a unit from the shaft 14 by simply removing the nut and washer combination. It will be understood, of course, that prior to removing the nut and washer combination 98, 99, the belt 84 will initially be removed, thus allowing the sheave sections 80 and 82 to assume their closed positions with the hub 132 remaining captured on the sleeve 90 by reason of the snap ring 139.

Referring now to FIG. 3, if it is desired to disassemble the torque sensing unit 10 for purposes of inspection of parts, repair or replacement thereof, such dismantling may be effected either while the sleeve 90 remains on the output shaft 14 or after the entire torque sensing assembly has been slid from the shaft as previously outlined. In either case, a pair of draw bolt assemblies 150, only one of which is shown in FIG. 3, are employed to force the cam follower hub 132 a slight distance forwardly against the action of the spring 140 so as to free the snap ring 139 and enable it to be removed from the sleeve 90.

Each draw bolt assembly 150 includes a draw bolt proper 152, the shank portion of which is capable of being passed through a clearance slot 154 (see also FIG. 4) and also through a registering aperture 156 (FIG. 3) in the cam follower ring 128 so that the forward end may be threadedly received in a socket 158 provided in the rear end of the cam 120. After the draw bolt 152 is thus in place, a cylindrical compression sleeve 160 which previously was telescoped over the shank portion of the bolt 152 fits within the slot 156 and is capable of being tightened against the following ring 128 by means of a nut 162 which is thredly received on the draw bolt 152.

Figure 4:
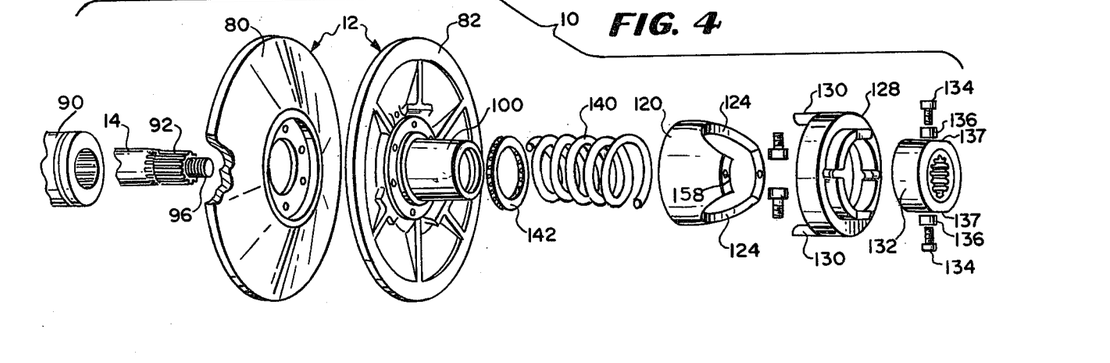
FIG. 4 is an exploded perspective view of the salient components of the torque sensing unit.

As clearly shown in FIG. 4, the two slots 154 are diametrically disposed and the two nuts 162 may be alternately worked in such a manner as to gradually force the follower hub 132 forwardly and cause it to release the snap ring 139 for removal purposes. After the snap ring 139 has been withdrawn from the sleeve 90, the two nuts 162 may be backed off until such time as the compressional force of the spring 140 is relieved as shown in dotted lines in FIG. 3 and thereafter the two draw bolts 152 may be unthreaded from their respective sockets 158 and the two draw bolt assemblies 150, including the compression sleeves 160, withdrawn. Thereafter, with the snap ring 139 removed, and the hub 132 forced from the follower sleeve 90 by spring action, further dismantling of the remainder of the torque sensing unit 10 may be accomplished in piece-by-piece fashion, it being deemed unnecessary herein to describe in detail the dismantling of each part.

Reassembly of the torque sensing unit 10 is accomplished by a reversal of the disassembly operation, piece-by-piece replacement of parts taking place until such time as the follower hub 132 assumes the dotted line position in which it is shown in FIG. 3. Thereafter, the draw bolt assemblies 150 may be reapplied to the cam 120 and follower sleeve 128 and the nuts 162 employed in an appropriate manner to slide the follower hub 132 forwardly onto and over the sleeve 90 to a point where it clears the groove which is provided in the same for reception of the snap ring 139. As soon as the snap ring is in place, the nuts 162 may be backed off and the two draw bolt assemblies 150 withdrawn. At this time the spring 140 will serve to force the follower hub 132 along the splined connection 138 and against the snap ring.

It has previously been stated that the torque sensing unit 10 has been designed particularly for use in connection with the application of driving torque to the rotor shaft of a harvesting combine and, accordingly, in FIG. 1 a preferred environment for the unit 10 wherein it is used in association with the power source or engine 38 and with the previously mentioned dual speed gear box arrangement 72 is disclosed. As shown in this view, the engine is provided with a drive shaft 170 from which power is supplied to a jackshaft 172 by means of a belt and pulley arrangement 174. The jackshaft 172 has mounted thereon a variable pitch sheave 176 which does not appear in FIG. 1 because it lies behind the variable pitch sheave 12 of the torque sensing unit 10 but which appears in both FIGS. 5 and 6. The variable pitch of diameter sheave 176 ordinarily operates at a fixed diameter setting but it is capable of being adjusted by electrical or other means which forms no part of the present invention and which, consequently is not disclosed herein. Such sheave is designed for cooperation with the variable diameter input sheave 12 of the torque sensing unit 10 by means of the belt 84. Stated briefly, when load conditions are such that the combine rotor 42 offers normal resistance to its rotary motion and normal power requirements are prevalent, the torque sensing sheave 12 and the sheave 176 will drive the rotor 42 at a speed that has been selected for the adjustable diameter sheave 176. Conversely, when load conditions are such as to demand a sudden increase in power, as for example to overcome a mat of clogged material in the concave 58, there will be relative rotation between the fixed section 80 and the shiftable section 82 of the torque sensing unit 10 which, through the cam 120 and cam followers 126, causes the section 82 to move axially toward the section 80. This increases the side pressure on the belt to thus eliminate slippage of the belt and relative rotation between the sections 80 and 82.

Figure 7:
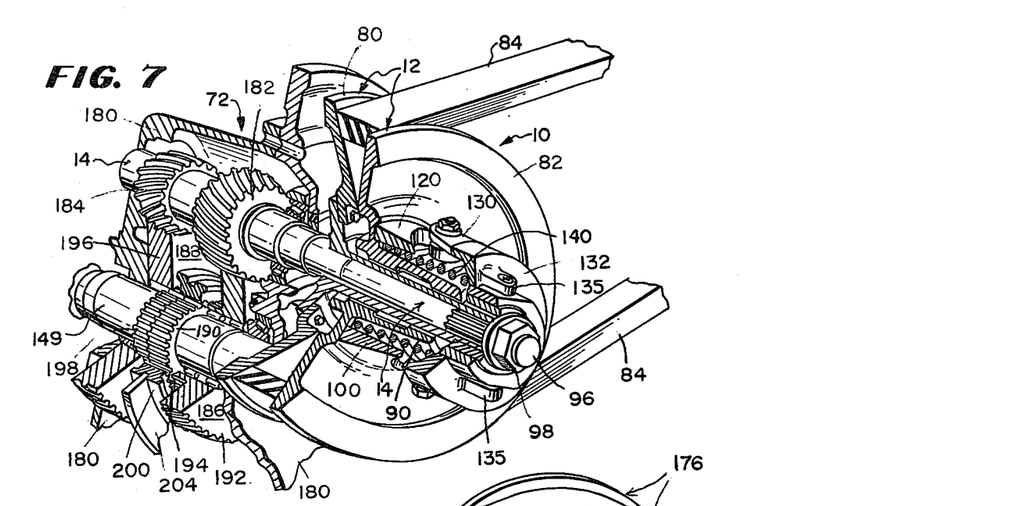
FIG. 7 is a three-quarter rear perspective view, largely in section, of the torque sensing unit as depicted in FIG. 6, showing the ouput or driven shaft thereof operatively associated with a two-speed rotor-driving gear case mechanism by means of which the motion of the rotary driven shaft may be transmitted to the combine rotor.

As shown in FIG. 7, the torque sensing unit 10 is particularly well adapted for rotor drive purposes when it is associated with the two-speed gear case arrangement 76 which, as previously indicated, forms the subject matter of the aforementioned copending application Ser. No. 883,775. Briefly, the gear case arrangement 72 embodies a case 180 which rotatably supports the shaft 14 and from which casing the shaft projects rearwardly. In such an application of the torque sensing unit 10, the shaft 14 is a component element of the gear case mechanism 72 rather than of the torque sensing unit so that the torque sensing unit is supplied with all of the previously described torque sensing instrumentalities including the sheave 12, cam 120, cam followers 126 etc., but is devoid of the output shaft 14 as a manufactured element thereof. However, when the torque sensing unit is operatively coupled to the gear case arrangement 72, the shaft 14 projects into the sleeve 90 and is held therein by the nut 98. When so projected into the sleeve 90 it functions as the output shaft of the torque sensing unit 10 but also it constitutes the input shaft of the gear case unit 72.

Within the casing of the gear case unit 72 the shaft 14 has mounted thereon a relatively large diameter rear gear 182 and a relatively small diameter forward gear 184. The casing structure 180 also supports the aforementioned output shaft 149 which projects forwardly from the casing 180 and which carries two compound gears 186 and 188, both such gears being freely and continuously rotatable on the output shaft 149. The two compound gears 186 and 188 are disposed on opposite sides of a medial raised annular splined rib 190 which is integral with the shaft 149 and the peripheral surface of which is formed with an annular series of splines. The rear compound gear 186 embodies a large diameter gear section 192 which meshes with the gear 182, and a small diameter gear section 194 having spline teeth thereon which are capable of longitudinal register with the splines on the periphery of the annular rib 190 on the shaft 149. Similarly, the forward compound gear 188 embodies a large diameter gear section 196 which meshes with the gear 184, and a small diameter gear section 198 which is provided with spline teeth thereon which are capable of register with the splines on the annular rib 190. The diameters of the raised annular rib 190 and of the spline tooth gear sections 194 and 198 are all equal, as well as are the number of splines or spline teeth thereon and their longitudinal disposition along the shaft 149 is such that they are arranged in side-by-side fashion for end-to-end alignment.

Encompassing the spline area offered by the spline teeth of the gear sections 194 and 198 and the splines of the raised rib 190 is an internally splined gear ratio shifting collar 200, the internal splines of which are slidable longitudinally over such spline area. The longitudinal extent of the internal splines on the collar 200 is equal to or slightly less than the longitudinal extent of the splines on the raised rib 190 so that when the collar is in register with the rib 190 as shown in FIG. 7 with no side overlap, the collar will remain motionless with the shaft 149 inasmuch as no power will be transmitted from the shaft 14 to the shaft 149 due to the fact that both compound gear 186 and 188, although rotating, are freely mounted on the shaft 149. This position of the collar 200 is considered to be the neutral position thereof and when it is effective no torque is applied to the combine rotor 42 so that the latter remains stationary.

The collar 200 is formed with an external annular groove 202 therein into which there extends an arcuate shifting fork 204 having facilities (not shown herein) whereby it may be shifted in a fore and aft direction in order to selectively shift the collar 200 either forwardly or rearwardly into overlapping relationship with respect to one or the other of the gear sections 194 or 198. When the fork and collar are shifted rearwardly, the internal splines on the collar will overlap both the splines on the rib 190 and spline teeth on the gear section 194 of the rearward compound gear 186 and, at this time, power will be transmitted from the shaft 14 to the shaft 149, inasmuch as the collar 200 will effectively couple the raised rib 190 on the shaft 149 to the constantly rotating compound gear 186. When the fork and collar are shifted forwardly, the internal splines on the latter will overlap both the splines on the rib 190 and the spline teeth on the gear section 198 of the forward compound gear 188 so that power will be transmitted from the shaft 14 to the shaft 149 because the collar 200 will effectively couple the rib 190 to the constantly rotating compound gear 188. Shifting of the collar 200 in the rearward direction will establish a high gear ratio drive and shifting of the collar forwardly will establish a low gear ratio inasmuch as the effective diameter of the gear 182 is greater than the effective diameter of the gear 184. Thus, where a relatively low speed of rotation of the combine rotor 42 is required, the collar will be shifted forwardly, and where a relatively high speed requirement for the rotor arises, the collar will be shifted rearwardly. It will be understood that the high or low speed settings for the gear case mechanism 72 will be effected by the operator of the combine only at such time as the combine rotor 42 is motionless, it being inadvisable to attempt to shift the collar 200 when there is relative motion between the splined rib 190 and either of the spline-tooth gear sections 194 or 198. As will be apparent from the more detailed description of the gear case unit 72 set forth in the aforementioned copending application, Ser. No. 833,775, detent means (not shown herein) are provided for holding the shift collar 200 in either of its two operative positions.

Regardless of whether a high gear ratio drive or a low gear ratio drive is prevalent in connection with the two-speed gear case arrangement 72, the torque sensing unit 10 of the present invention will continue to function in its normal manner to prevent belt slippage and accomplish the various objectives which have been ascribed to it herein.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. A torque sensing unit adapted for use in driving the threshing rotor of a harvesting combine, said unit comprising a variable diameter input sheave designed for cooperation with an engine-driven V-belt, and an output shaft concentric with the input sheave and having means whereby it may be drivingly connected to said rotor, an inner sleeve mounted on said shaft in axially fixed relation for rotation in unison therewith, an outer sleeve rotatably mounted on said inner sleeve and slidable axially therealong, a fixed sheave section extending radially from the front end of said inner sleeve, an axially shiftable sheave section extending radially from the front end of said outer sleeve, opposed V-belt engaging surfaces on said sheave sections, a collar-like hub mounted on the rear end of said inner sleeve for rotation in unison therewith, a generally cylindrical follower-supporting sleeve pivotally mounted about a pivot axis on said hub for limited axial side sway relative to the axis of the hub, a compression spring interposed between said hub and axially shiftable sheave section and yieldingly biasing the latter sheave section toward the fixed sheave section, an open-ended tubular cam member coaxial with and surrounding the sleeves and having its front rim region secured to said axially shiftable sheave section and projecting rearwardly therefrom, a pair of diametrically disposed generally V-shaped in configuration rearwardly opening cam races formed in the rear rim region of said cam member, a pair of roller-type cam followers projecting in diametric fashion into the confines of a respective cam race and carried in diametrically opposed relationship by said generally cylindrical follower-supporting sleeve upon coaxial axes parallel to said pivot axis and cooperating with said cam races whereby differential rotational movement between said sheave sections incident to the frictional drag exerted by the V-belt on said movable sheave section tending to cause the same to overrun the fixed sheave section incident to an increase in the load on the output shaft will exert a camming action by the followers against the cam races and augment the biasing action of said spring against said axially shiftable sheave section.

2. A torque sensing unit as set forth in claim 1, wherein the edge surfaces of said cam races are developed for line contact with their respective cam followers with the lines of contact between the two followers and their respective cam races being coaxial so that the common axis of the followers at all times intersects the longitudinal axis of the cam member.

3. A torque sensing unit as set forth in claim 2, wherein each follower embodies an outer roller body mounted by means of an inner non-metallic bushing on a stud carried by said follower-supporting sleeve.

4. A torque sensing unit as set forth in claim 2, wherein the follower-supporting sleeve is pivoted to the hub at diametrically disposed regions by studs having surrounding non-metallic bushings.

5. A torque sensing unit as set forth in claim 3, wherein the follower-supporting sleeve is pivoted to the hub at diametrically disposed regions by studs having surrounding non-metallic bushings.

6. A torque sensing unit adapted for use in driving the threshing rotor of a harvesting combine, said unit comprising a variable diameter input sheave designed for cooperation with an engine-driven V-belt, and an output shaft concentric with the input sheave and having means whereby it may be drivingly connected to said rotor, an inner sleeve mounted on said shaft in axially fixed relation for rotation in unison therewith, an outer sleeve rotatably mounted on said inner sleeve and slidable axially therealong, a fixed sheave section extending radially from the front end of said inner sleeve, an axially shiftable sheave section extending radially from the front end of said outer sleeve, opposed V-belt engaging surfaces on said sheave sections, a collar-like hub mounted on the rear end of said inner sleeve for rotation in unison therewith, a compression spring interposed between said hub and axially shiftable sheave section and yieldingly biasing the latter sheave section toward the fixed sheave section, an open-ended tubular cam member coaxial with and surrounding the sleeves and having its front rim region secured to said axially shiftable sheave section and projecting rearwardly therefrom, a pair of diametrically disposed rearwardly opening cam races formed in the rear rim region of said cam member, a pair of roller-type cam followers pivotally mounted about a pivot axis on said hub for limited axial side sway relative to the axis of the hub and cooperating with said cam races whereby differential rotational movement between said sheave sections incident to the frictional drag exerted by the V-belt on said movable sheave section tending to cause the same to overrun the fixed sheave section incident to an increase in the load on the output shaft will exert a camming action by the followers against the cam races and augment the biasing action of said spring against said axially shiftable sheave section, and wherein said outer sleeve is of an elongated nature and is formed with an internal annular groove in its medial region, said groove defining an annular cavity surrounding the inner sleeve, front and rear bushings are disposed between the inner and outer sleeves on opposite sides of said groove, front and rear lubricant seals are disposed between the inner and outer sleeves adjacent each end of the latter sleeve, an internal longitudinal passage in the outer sleeve traverses the front bushing and establishes communciation between the front seal and cavity and a generally radial lubricant supply passage having an inlet fitting associated therewith is formed in said axially shiftable sheave section and communicates with said cavity whereby lubricant introduced to said lubricant supply passage will flow to said cavity for subsequent lubrication of both bushings.

7. A torque sensing unit as set forth in claim 6, wherein said rear seal is a lubricant purging seal which lies radially inwardly of said followers so that lubricant purged therefrom may be distributed by centrifugal force to said followers.

8. A torque sensing unit adapted for use in driving the threshing rotor of a harvesting combine, said unit comprising a variable diameter input sheave designed for cooperation with an engine-driven V-belt, and an output shaft concentric with the input sheave and having means whereby it may be drivingly connected to said rotor, an inner sleeve mounted on said shaft in axially fixed relation for rotation in unison therewith, an outer sleeve rotatably mounted on said inner sleeve and slidable axially therealong, a fixed sheave section extending radially from the front end of said inner sleeve, an axially shiftable sheave section extending radially from the front end of said outer sleeve, opposed V-belt engaging surfaces on said sheave sections, a collar-like hub mounted on the rear end of said inner sleeve for rotation in unison therewith, a compression spring interposed between said hub and axially shiftable sheave section and yieldingly biasing the latter sheave section toward the fixed sheave section, an open-ended tubular cam member coaxial with and surrounding the sleeves and having its front rim region secured to said axially shiftable sheave section and projecting rearwardly therefrom, a pair of diametrically disposed rearwardly opening cam races formed in the rear rim region of said cam member, a pair of roller-type cam followers pivotally mounted about a pivot axis on said hub for limited axial side sway relative to the axis of the hub and cooperating with said cam races whereby differential rotational movement between said sheave sections incident to the frictional drag exerted by the V-belt on said movable sheave section tending to cause the same to overrun the fixed sheave section incident to an increase in the load on the output shaft will exert a camming action by the followers against the cam races and augment the biasing action of said spring against said axially shiftable sheave section, and wherein a roller type thrust bearing surrounds the outer sleeve and is interposed between the forward end of the compression spring and axially shiftable sheave section to prevent the transmission of torque from said axially shiftable sheave section through said spring to said hub and axially fixed sheave section and thereby affords substantially frictionless rotation between said sleeves.

9. A torque sensing unit as set forth in claim 8, wherein said compression spring is of the helix-wound type, is coaxial with the sleeves and output shaft, has its forward end effectively bearing against said axially shiftable sheave section through the medium of said thrust bearing and its rear end bearing against said hub encompasses said outer sleeve, and is interposed for the most part between said outer sleeve and cam.

10. A torque sensing unit adapted for use in driving the threshing rotor of a harvesting combine, said unit comprising a variable diameter input sheave designed for cooperation with an engine-driven V-belt, and an output shaft concentric with the input sheave and having means whereby it may be drivingly connected to said rotor, and inner sleeve mounted on said shaft in axially fixed relation for rotation in unison therewith, an outer sleeve rotatably mounted on said inner sleeve and slidable axially therealong, a fixed sheave section extending radially from the front end of said inner sleeve, and axially shiftable sheave section extending radially from the front end of said outer sleeve, opposed V-belt engaging surfaces on said sheave sections, a collar-like hub mounted on the rear end of said inner sleeve for rotation in unison therewith, a compression spring interposed between said hub and axially shiftable sheave section and yielding biasing the latter sheave section toward the fixed sheave section, an open-ended tubular cam member coaxial with and surrounding the sleeves and having its front rim region secured to said axially shiftable sheave section and projecting rearwardly therefrom, a pair of diametrically disposed rearwardly opening cam races formed in the rear rim region of said cam member, a follower supporting sleeve carried by said hub a pair of roller-type cam followers supported by said follower supporting sleeve and cooperating with said cam races whereby differential rotational movement between said sheave sections incident to the frictional drag exerted by the V-belt on said movable sheave section tending to cause the same to overrun the fixed sheave section incident to an increase in the load on the output shaft will exert a camming action by the followers against the cam races and augment the biasing action of said spring against said axially shiftable sheave section, wherein said collar-like hub and inner sleeve are provided with a spline connection therebetween which allows for limited forward sliding motion of the hub on the inner sleeve against the action of the compression spring, and a removable snap ring adjacent the rear end of the inner sleeve limits the extent of rearward sliding motion of the hub on said latter sleeve, whereby forcible shifting of the hub forwardly on said inner sleeve a slight distance against the action of the spring will free the snap ring for removal purposes so that, after removal thereof from the inner sleeve, the spring, the hub with the followers thereon and the axially shiftable sheave section with the inner sleeve and cam member carried thereby may be slid rearwardly from the inner sleeve individually and successively in the order named and wherein said tubular cam member is formed with two rearwardly extending cam lobes separating said cam races, and the rear edge of each lobe is provided with a threaded socket, the follower-supporting sleeve is formed with a pair of openings therethrough which are capable of being axially aligned with said threaded sockets said openings being designed for sliding reception therethrough of a pair of elongated draw bolts which are threadedly receivable in said threaded sockets whereby, when threaded nuts which are received on the draw bolts are tightened against the hub, forward axial thrust is applied to the latter tending to shift the same forwardly and release the snap ring for removal purposes.

11. A torque sensing unit as set forth in claim 10, wherein said inner sleeve and output shaft are provided with a spline connection therebetween and a nut is threadedly received over the rear end of said input shaft, said nut and spline connection constituting the sole means whereby the inner sleeve is removably mounted on said output shaft, said nut, upon removal thereof from the output shaft, permitting removal of the inner sleeve from the output shaft.

12. In a harvesting combine, in combination, a threshing rotor, a power source embodying a drive shaft, a drive transmission operatively connecting said drive shaft to the rotor in driving relationship, said transmission including a variable diameter driving sheave including a pair of V-belt engaging members movable toward and away from each other, means operatively connecting said drive shaft to said driving sheave, and a variable diameter torque-responsive driven sheave including an axially fixed sheave section and an axially shiftable sheave section freely rotatably relative to the fixed section, a spring biasing said axially shiftable sheave section toward said fixed sheave section for V-belt engaging purpose, a V-belt trained around said variable diameter driving and driven sheaves, means operatively connecting said fixed sheave section to said rotor in driving relationship, cooperating cam means effective between said sheave sections and responsive to load exerted by said rotor on said fixed sheave section for augmenting the action of said spring in moving the axially shiftable sheave section toward the axially fixed sheave section in response to relative rotation between said sheave sections as a result of an increase in such load and, wherein said cooperating cam means includes a pair of cam races mounted on said axially shiftable sheave in the form of individually rotatable and coaxially disposed rollers section at diametrically disposed regions, a cam follower cooperating with each cam race, and means constraining said cam followers to rotate bodily in unison with said axially fixed sheave section and permit limited side sway relative thereto.

* * * * *

UNITED STATES PATENT OFFICE
CERTIFICATE OF CORRECTION

Patent No. 4,173,155          Dated November 6, 1979

Inventor(s) Paul C. Togami, T. Gary Drayer, James M. Francis

It is certified that error appears in the above-identified patent and that said Letters Patent are hereby corrected as shown below:

In Column 14, lines 59 and 60, delete "in the form of individually rotatable and coaxially disposed rollers"; and in same column, line 61, after follower insert --in the form of individually rotatable and coaxially disposed rollers--.

Signed and Sealed this

Twenty-sixth Day of February 1980

[SEAL]

Attest:

SIDNEY A. DIAMOND

*Attesting Officer*      *Commissioner of Patents and Trademarks*